US006857582B1

(12) United States Patent
Wang

(10) Patent No.: US 6,857,582 B1
(45) Date of Patent: Feb. 22, 2005

(54) VEHICLE WINDSHIELD SPRAYING AND LIGHTING ASSEMBLY

(76) Inventor: Calvin S. Wang, 768 S. Turnbull Canyon Rd., City of Industry, CA (US) 91745

( * ) Notice: Subject to any disclaimer, the term of this patent is extended or adjusted under 35 U.S.C. 154(b) by 195 days.

(21) Appl. No.: 10/233,216

(22) Filed: Sep. 3, 2002

(51) Int. Cl.[7] .............................................. B05B 1/10
(52) U.S. Cl. .................... 239/284.1; 239/17; 239/211; 239/289; 362/96; 362/496; 362/545
(58) Field of Search .......................... 239/284.1, 284.2, 239/69, 71, 17, 289, 211; 362/96, 806, 459, 496, 545, 555, 565

(56) References Cited

U.S. PATENT DOCUMENTS

| | | | | |
|---|---|---|---|---|
| 4,749,126 A | * | 6/1988 | Kessener et al. | 362/96 |
| 6,021,960 A | * | 2/2000 | Kehat | 239/289 |
| 6,074,078 A | * | 6/2000 | Georgeff et al. | 239/284.1 |
| 6,305,618 B1 | * | 10/2001 | Lin | 239/284.1 |

* cited by examiner

Primary Examiner—Steven J. Ganey
(74) Attorney, Agent, or Firm—Albert O. Cota

(57) ABSTRACT

A vehicle windshield spraying and lighting assembly (10) that includes a nozzle and light housing (12) that is designed to be attached to a vehicle's (80) hood cowling or hood (82). The housing (12) houses a rear facing adjustable spray nozzle (24) and a forward facing LED (30) and strobe light (34). The LED and strobe light are operated by an electronic control circuit (50) that is enclosed within an electronic enclosure (52) designed to be attached to an accessible structure on the vehicle (80). The circuit (50) includes a single-pole, five-position switch (51) that allows the LED (30) and strobe light (34) to be operated as follows:

first position: LED and strobe light off,
second position: LED on, strobe light off,
third position: LED on, strobe light flashing,
fourth position: LED off, strobe light flashing,
fifth position: LED off, strobe light on.

16 Claims, 4 Drawing Sheets

VEHICLE WINDSHIELD SPRAYING AND LIGHTING ASSEMBLY

TECHNICAL FIELD

The invention pertains to the general field of vehicle windshield fluid spraying units and more particularly to a vehicle windshield spraying and lighting assembly that incorporates a forward facing LED and strobe light.

BACKGROUND ART

One of the most popular means of expressing individual taste is the customizing of a vehicle. For years, people have altered and changed the appearance of their vehicles by means such as custom tires and wheels, unique paint jobs, etc.

A particularly effective means of customizing a vehicle is to change the existing lighting or to add additional lights. While some lighting changes or additions are done to add performance or safety, such as fog lights, other lighting effects are simply used to add to the aesthetic appearance of the vehicle.

Due to the popularity of adding lights or light lighting, many parts or locations of a vehicle that would not normally include lights are now being illuminated. License plate frames, a vehicle's under-carriage and and many interior locations are displaying unique illumination, often consisting of bright, iridescent colors.

Although it seems as if there are no places left on vehicles that can be illuminated there are certain non-conventional locations or parts of a vehicle that would provide an ideal base for illumination. One such part is a vehicle's windshield washer nozzles, which are located in a highly visible location on the vehicle.

A search of prior art patents and industry literature did not disclose any automotive lighting assemblies that read directly on the claims of the instant invention.

DISCLOSURE OF THE INVENTION

A vehicle windshield spraying and lighting assembly that functions in combination with a vehicle comprising a hood cowling or a hood having a pair of vehicle fluid bores, a fluid hose, a windshield fluid reservoir and a vehicle battery.

The assembly comprises a housing having a lower surface, a front section and an integral rear section. The lower surface has a fluid tube bore located near the rear section. The rear section also has a spray nozzle bore and the front section has an upper, protruding LED cavity and a frontal strobe light cavity.

The assembly also comprises a fluid outlet tube having an upper end and a lower end. The lower end extends through the fluid tube bore, the vehicle fluid bore and is immersed in the windshield fluid reservoir. The upper end terminates with an adjustable spray nozzle that extends outward from the spray nozzle bore.

An LED is located within the LED cavity and a strobe light is located within the frontal strobe light cavity. Both the LED and the strobe light are connected to the vehicle battery by means of a first electronic control circuit or a second electronic control circuit.

An attachment means is utilized to attach the nozzle and light housing to the vehicle's hood cowling or hood.

In view of the above disclosure, the primary object of the invention is to provide a vehicle windshield spraying and lighting assembly that will replace a conventional windshield spray nozzle with a nozzle that can produce LED and/or strobe light illumination in addition to applying cleaning fluid to the vehicle's windshield.

It is also an object of the invention to provide a vehicle windshield spraying and lighting assembly that:

is easy to attach and use, can be included as an OEM part of a new vehicle or can be sold as an after-market accessory, can be color-matched to a vehicle's hood cowling or hood color, requires little or no maintenance, is cost effective from both a manufacturer's and consumer's point of view, and is primarily designed for off-road use and during inclement weather such as a snow storm.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
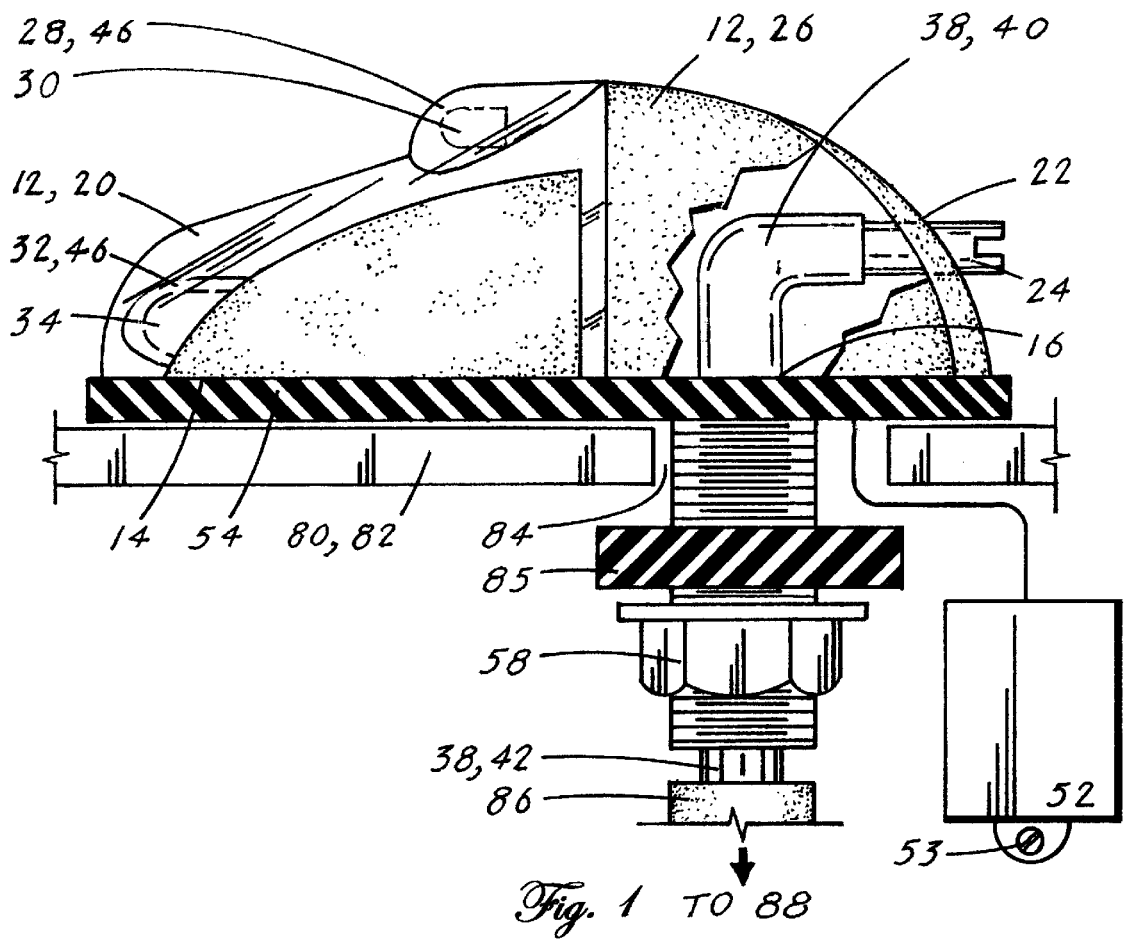
FIG. 1 is a side elevational view of a vehicle windshield fluid spraying a light assembly that is attached to a hood cowling or the hood of a vehicle.

The best mode for carrying out the invention is presented in terms of a preferred embodiment for a vehicle windshield spraying and lighting assembly 10, (hereinafter "VWSLA 10"). The VWSLA 10 provides a means by which a conventional vehicle windshield spray nozzle can be replaced with a nozzle that produces two distinct types of illumination in addition to the spraying function. The illumination is either from an LED, a strobe light, or a combination of both.

The VWSLA 10, as shown in FIGS. 1–6, is comprised of the following major elements: a nozzle and light housing 12, an adjustable spray nozzle 24, an LED 30, a strobe light 34, a first electronic control circuit 48, a second electronic control circuit 50, and an electronic control circuit enclosure 52.

The VWSLA 10 functions in combination with a vehicle 80 comprising a hood cowling or a hood 82 having a pair of vehicle fluid bores 84, a fluid hose 86, a windshield fluid reservoir 88, and a vehicle battery 90. Most vehicles utilize a pair of windshield spray nozzles with one located on the right side and one on the left side of the hood cowling or hood. Since both of the nozzles are the same, this disclosure will only describe one nozzle.

Figure 2:
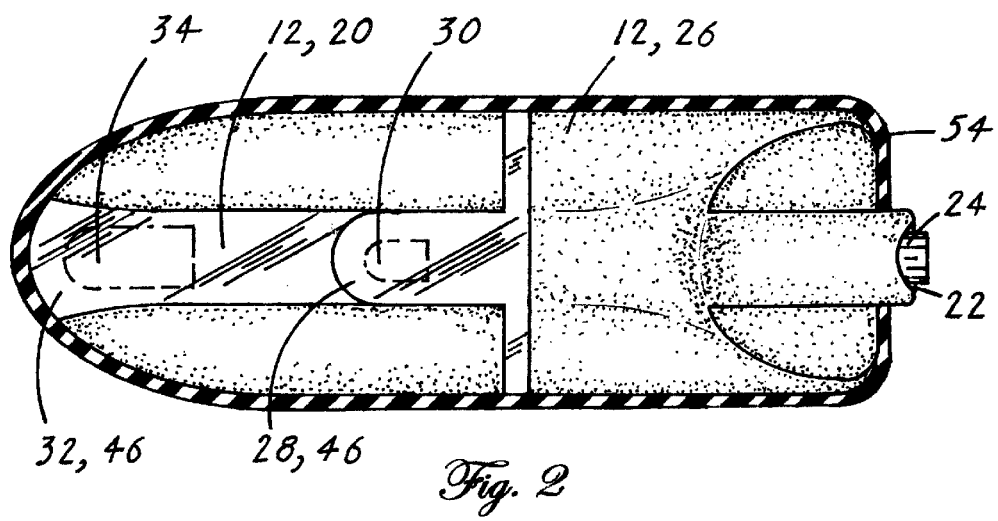
FIG. 2 is a top plan view of the assembly.

The nozzle and light housing 12, as shown in FIGS. 1–4, is comprised of a lower surface 14, a front section 20 and an integral rear section 26. The lower surface 14 has a fluid tube bore 16 located in the vicinity of the rear section 26 which-also has a spray nozzle bore 22. The front section 20 has an upper, protruding LED cavity 28 and a strobe light cavity 32, as best shown in FIGS. 1 and 2.

A fluid outlet tube 38, as shown in FIG. 1, comprises an upper end 40 and a lower end 42. The lower end 42 extends through the fluid tube bore 16, the vehicle fluid bore 84 and is immersed in a windshield fluid reservoir 88. The upper end 40 terminates with the adjustable spray nozzle 24 that extends outward from the spray nozzle bore 22.

Figure 5:
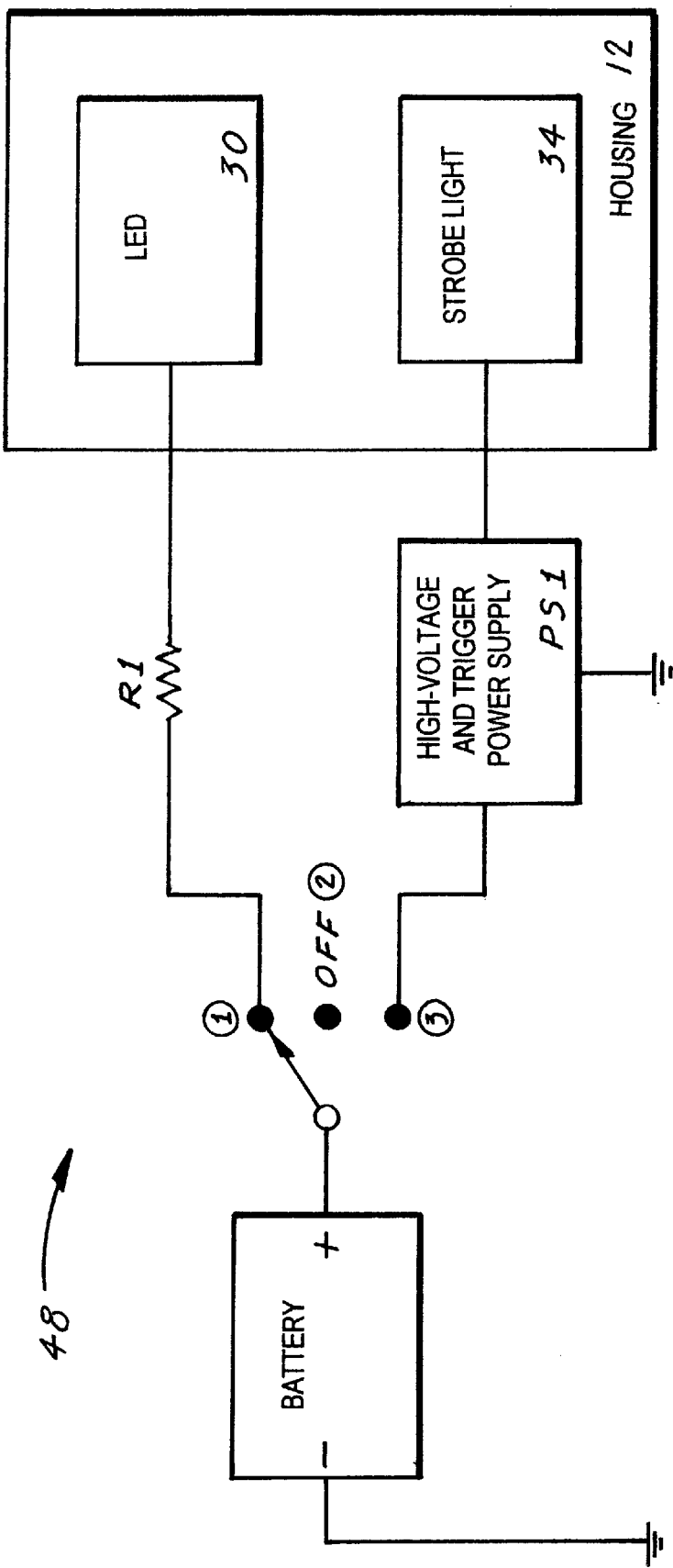
FIG. 5 is a block diagram of a first electronic control circuit.
Figure 6:
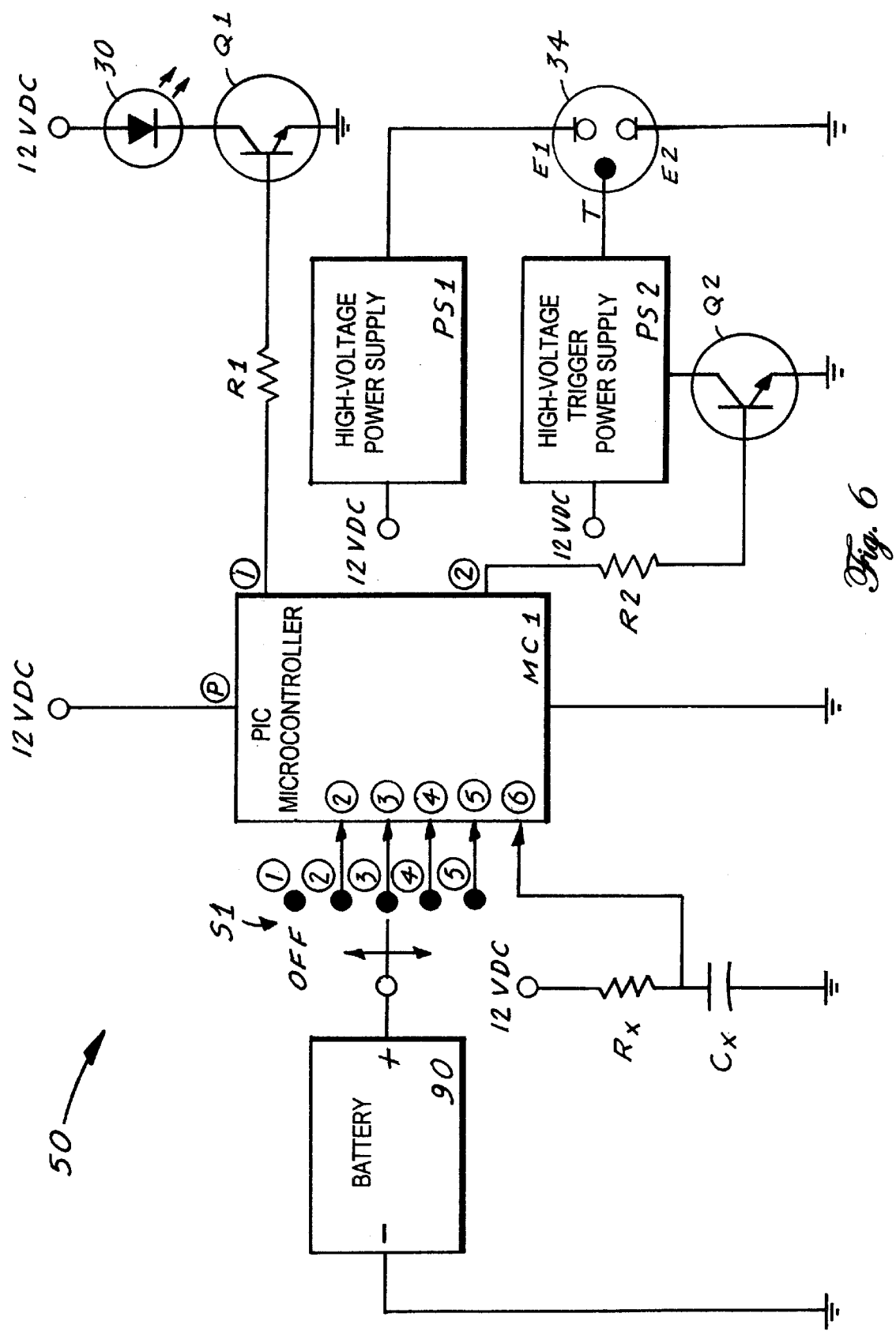
FIG. 6 is a block diagram of a second electronic control circuit.

As shown in FIGS. 1 and 2, the LED 30 is located within the LED cavity 28 and the strobe light 34 is located within the frontal strobe light cavity 32. Both the LED 30 and the strobe light 34 are connected to the vehicle battery 90 by means of the electronic control circuit which consists of the first electronic control circuit 48, as shown in FIG. 5, or the second electronic control circuit 50, as shown in FIG. 6.

The rear section 26 of the nozzle and light housing 12 has a non-transparent finish, such as chrome plating. The front section 20, in the area encompassing the LED 30 and the strobe light 34, is transparent so that the illumination from the LED 30 and strobe light 34 can be seen. As shown in FIGS. 1 and 2, the outer tip of the LED cavity 28 and the outer tip of the frontal strobe light cavity 32 include a magnifying section 46.

Figure 3:
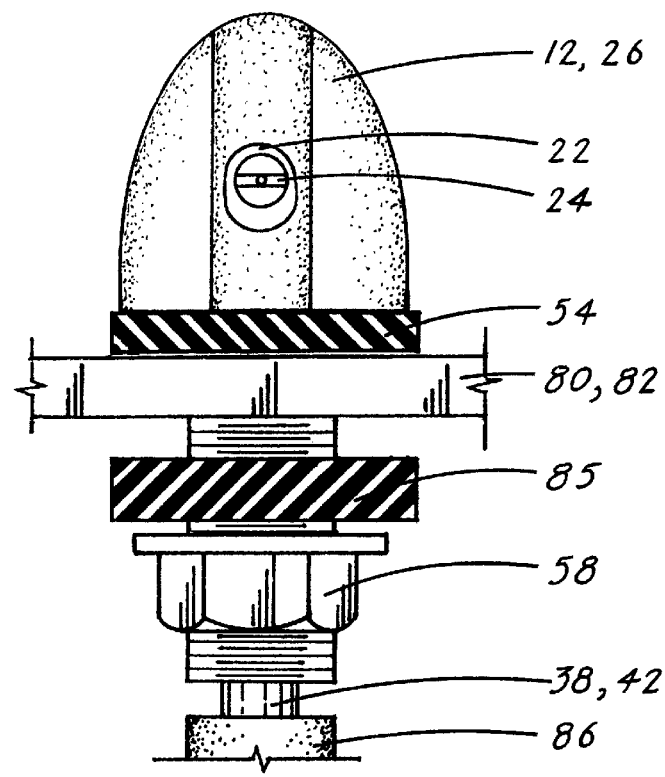
FIG. 3 is a rear elevational view of the assembly.
Figure 4:
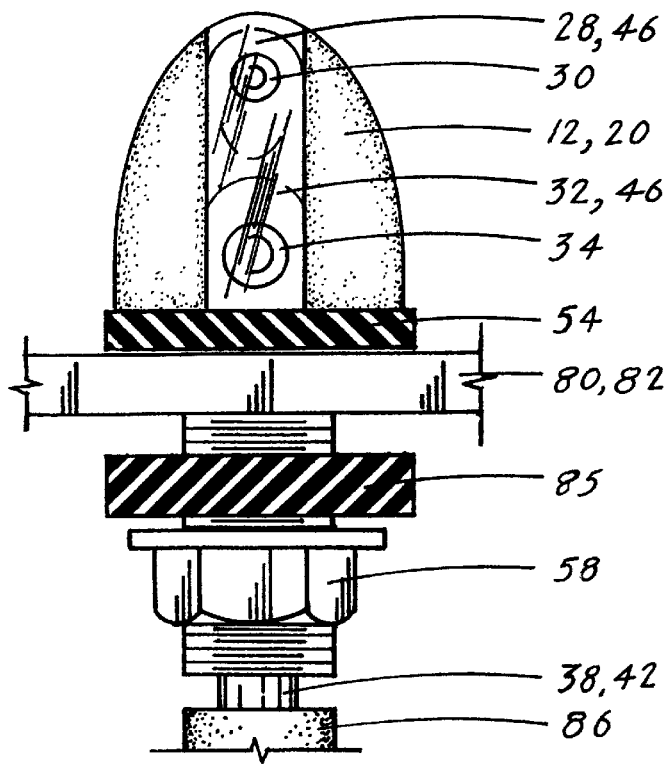
FIG. 4 is a front elevational view of the assembly.

In order to attach the nozzle and light housing 12 to the vehicle's hood cowling or hood 82 an attachment means is utilized. A typical attachment means, as shown in FIGS. 1, 3 and 4, comprises a resilient mounting spacer 54 located between the lower surface 14 of the housing 12 and the hood cowling or hood 82. The VWSLA 10 also has a lock nut 58 and a resilient washer 56, which is located between the hood cowling or hood 82 and the lock nut 58.

The assembly 10 can be operated by either a first electronic control circuit 48 or a second electronic control circuit 50. The circuit(s) are enclosed within a circuit enclosure 52, as shown in FIG. 1, that is attached to an accessible structure on a vehicle 80 by means of a bolt 53.

The first circuit 48, as shown in FIG. 5, is comprised of two major elements: a single-pole, three-position switch S1 and a combination high-voltage and trigger power supply PS1. The pole of the switch S1 is connected to the positive (+) terminal of the vehicle battery 90. The first switch position is connected, via a current limiting resistor R1 to the LED 30, the center switch position is an LED and strobe light off position, and the third switch position is connected to the combination high voltage and trigger power supply PS1.

The output of the power supply PS1 is connected to the strobe light 34. When the pole of switch S1 is placed in the first position the LED is turned on and the strobe light 34 is off; when the switch S1 is placed in the third position the LED is off and the strobe light is on.

The second circuit 50, as shown in FIG. 6, is comprised of four major elements: a single-pole, five position switch S1, a PIC microcontroller MC1, a high-voltage power supply PS1, and a high-voltage trigger power supply PS2.

The single-Pole five-position switch S1 has its pole connected to the positive (+) terminal of the vehicle battery 90. The five positions provide the following functions:

first position: LED and strobe light off,
second position: LED on, strobe light off,
third position: LED on, strobe light flashing,
fourth position: LED off, strobe light flashing
fifth position: LED off, strobe light on.

The outputs of the switch S1 are applied to the PIC microcontroller MCI which preferably consists of an automotive PIC microcontroller which operates directly from the 12-volt d-c power supplied by the vehicle battery 90 and that is applied to the microcontroller through a power input P.

The microcontroller MC1 as configured for the instant invention, also has a second through a sixth input. The second through fifth inputs correspond to the second through fifth outputs from the switch S1. The sixth input is applied through an RC network RC1 that sets the clock frequency of the microcontroller.

The microcontroller MCI, as purchased, has twelve (12) input/output lines which allow additional switch positions to be added for future flash rates. Additionally, the flash rates can be changed with no hardware or circuit board revisions.

The PIC microcontroller MCI has a first output and a second output. The first output is connected through a first current-limiting resistor R1 to the base of a first NPN transistor Q1 which operates the LED 30.

To operate the strobe light 34 the high-voltage power supply PS1 and the high-voltage trigger power supply RS1 are required. The power supply PS1 produces the high voltage necessary to light the strobe light 34 and the power supply PS2 produces the strobe light trigger voltage. The power supply PS1 steps up the 12-Volt d-c input to between 250–300 volts d-c which is then applied to a first electrode E1 on the strobe light 34. The second electrode E2 is connected to ground.

The second output signal from the microcontroller MC1 is applied through a second current limiting resistor R2 to the base of transistor Q2 whose output is applied through the collector of Q2 to the power supply PS2. The output of the Power supply PS2 is the trigger voltage that is applied to a trigger electrode T on the strobe light 34 which causes the strobe light to flash.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. A vehicle windshield spraying and lighting assembly comprising a housing having a fluid spray nozzle and incorporating, at least one light that is comprised of an LED and a strobe light, that illuminate in a forward direction, wherein said lights are operated by an electronic control circuit having means for allowing the LED to illuminate while the strobe light is off or to have the strobe light illuminate while the LED is off.

2. A vehicle windshield spraying and lighting assembly comprising a housing having a fluid spray nozzle incorporating at least one light that is comprised of an LED and a strobe light, that illuminate in a forward direction, wherein said lights are operated by an electronic control circuit consisting of a first electronic control circuit comprising:

a) a high-voltage and trigger power supply, and
b) a single-pole, three-position switch, wherein the pole is connectable to a positive (+) terminal of a vehicle battery, the first switch position is connected through a current limiting resistor to said LED, the second position is an OFF position, and the third position is connected through the high-voltage and trigger power supply to the strobe light, wherein when the switch is placed in the first position the LED illuminates, and when the switch is placed in the third position, the LED is off and the strobe light illuminates.

3. A vehicle windshield spraying and lighting assembly that functions in combination with a vehicle comprising a hood cowling or a hood having a pair of vehicle fluid bores, a fluid hose, a windshield fluid reservoir and a vehicle battery, said assembly comprising:

a) a housing comprising a lower surface, a front section and an integral rear section, wherein the lower surface having a fluid tube bore located in the vicinity of the rear section, the rear section also having a spray nozzle bore, the front section having an upper, protruding LED cavity and a frontal strobe light cavity, b) a fluid outlet tube having a lower end and an upper end, wherein the lower end extends through the fluid tube bore, the vehicle fluid bore and is immersed in the windshield fluid reservoir and the upper end terminates with an adjustable spray nozzle that extends outward from the spray nozzle bore, c) an LED located within the LED cavity, and d) a strobe light located within the frontal strobe light cavity, wherein the LED and the strobe light are connected to the vehicle battery by means of an electronic control circuit and, e) means for attaching said housing to the hood cowling or the hood.

4. The assembly as specified in claim 3 wherein the rear section of said housing has a non transparent finish.

5. The assembly as specified in claim 4 wherein the non-transparent finish consists of chrome plating.

6. The assembly as specified in claim 3 wherein the front section, in the area encompassing the LED and the strobe light, is transparent.

7. The assembly as specified in claim 3 wherein the outer tip of the LED cavity includes a magnifying section.

8. The assembly as specified in claim 7 wherein the outer tip of the strobe light cavity includes a magnifying section.

9. The assembly as specified in claim 3 further comprising a resilient mounting spacer located between the lower surface of said housing and the hood cowling or hood.

10. The assembly as specified in claim 9 further comprising a lock nut.

11. The assembly as specified in claim 10 further comprising a resilient washer located between the hood cowling or hood and the lock nut.

12. The assembly as specified in claim 3 wherein said electronic control circuit consists of a first electronic control circuit comprising:

a) a high-voltage and trigger power supply, and b) a single-pole, three-position switch, wherein the pole is connected to the positive (+) terminal of the vehicle battery, the first switch position is connected to said LED, the center position is an OFF position, and the third position is connected through the high-voltage and trigger power supply to the strobe light, wherein when the switch is placed in the first position the LED illuminates, and when the switch is placed in the third position, the LED is off and the strobe light illuminates.

13. The assembly as specified in claim 3 wherein said electronic control circuit consist of a second electronic control circuit comprising:

a) a single-pole, five position switch, wherein the five positions provide the following functions:
  (1) first position: LED and strobe light off,
  (2) second Position: LED on, strobe light off,
  (3) third position: LED on, strobe light flashing,
  (4) fourth position: LED off, strobe light flashing,
  (5) fifth position: LED off, strobe light on, b) a PIC microcontroller having:
  (1) a first power input connected to the vehicle battery,
  (2) a second through fifth input corresponding to the second through fifth position of the single-pole, five position switch,
  (3) a sixth input connected to an RC-network that sets the clock frequency of the microcontroller,
  (4) a first output and a second output, wherein the first output is connected through a first current-limiting resistor R1 to a first transistor Q1 which drives the LED, c) a high-voltage power supply having an output connected to a first electrode E1 on the strobe light, wherein the strobe light also has a second electrode E2 connected to circuit ground and a trigger input, d) a high-voltage trigger power supply having an input and an output, and e) a second transistor Q2 having its base connected through a second current-limiting resistor R2 to the second output of the microcontroller, its collector connector to the input of the high-voltage trigger circuit, wherein when the second transistor Q2 is turned on by the microcontroller, it activates the high-voltage trigger power supply which produces a trigger signal that causes the strobe light to illuminate.

14. The assembly as specified in claim 13 wherein the PIC microcontroller is comprised of an automotive PIC microcontroller that requires a 12-volt d-c input.

15. The assembly as specified in claim 13 wherein the transistor Q1 and Q2 are comprised of NPN transistors.

16. The assembly as specified in claim 15 wherein said electronic control circuit is enclosed within a circuit enclosure attached to an accessible structure of a vehicle.

* * * * *